United States Patent Office 3,819,792
Patented June 25, 1974

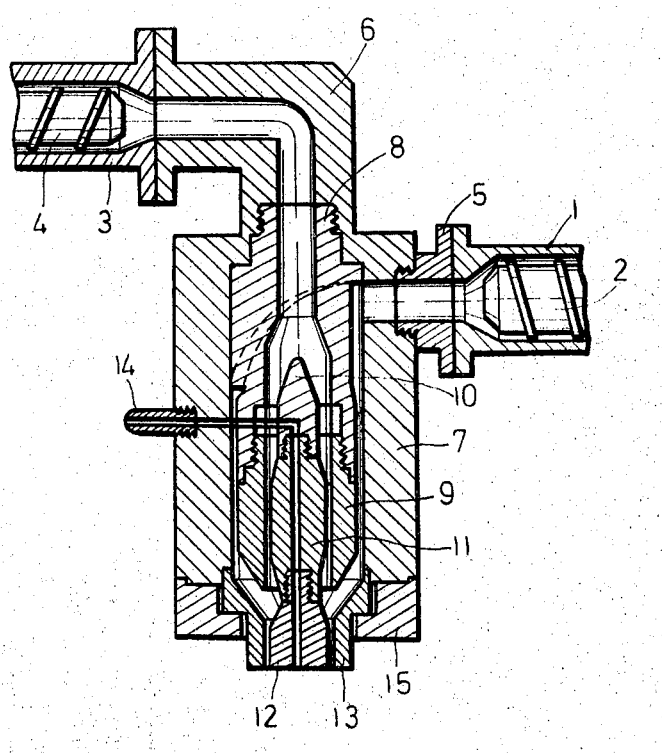

3,819,792
PROCESS FOR PRODUCING A THERMO-
PLASTIC SHAPED ARTICLE HAVING A
DOUBLE LAYERED WALL
Katsuya Ono, Gifu, and Motozo Fujiwara, Yoshinari
Tabe, and Norihiko Kawahito, Nagoya, Japan, assignors to Toray Industries, Inc., Tokyo, Japan
Filed July 20, 1971, Ser. No. 164,241
Claims priority, application Japan, July 21, 1970,
45/63,684; Dec. 15, 1970, 45/111,095; Dec. 16,
1970, 45/125,329
Int. Cl. B29c 17/07; B29d 23/04; B29f 3/12
U.S. Cl. 264—95  7 Claims

ABSTRACT OF THE DISCLOSURE

A thermoplastic resin shaped article having a double layered wall structure is provided wherein both layers are strongly bonded to each other. One layer thereof comprises a mixture of (a) 30 to 95% by weight of C–2 or –3 olefin homopolymer or copolymer or a blend thereof and (b) 70 to 5% by weight of an ethylene copolymer containing 0.1 to 10% by mole of a zinc salt of methacrylic acid, and the other layer comprises polyamide. The shaped article is prepared by the steps of separately melting both layer components and then, joining both the melts under a pressure inside a die of an extruder before the melts are solidified and extruding said melts as a double layered tubular article. The shaped article has an improved resistance to the transmission of various chemicals, gasoline, water vapour, etc.

This invention relates to a thermoplastic shaped article having a double layered wall structure. More particularly, it relates to a thermoplastic shaped article having a double layered wall structure wherein both layers, one layer comprising a mixture of an olefin polymer and an ethylene copolymer and the other layer comprising polyamide, are strongly bonded with each other and a method of the production thereof.

Polyethylene, which is one of the typical polyolefin resins, has been, up to date, widely used for the production of shaped articles such as a blow-molded vessel, a wrapping film and the like because of its relative high chemical resistance, high impact strength at a low temperature, improved flexibility and moisture resistance. Polyethylene has however a defect in transmission therethrough of chemicals such as halogenated hydrocarbons, alcohols, ethers, ketones, etc. For example, the transmission rate of gasoline through polyethylene is scores of times that through nylon-6, which fact results in the disadvantage that the thickness of a polyethylene container for gasoline must be increased to a great degree. Further, polyethylene is inferior in gas permeability to such as oxygen, carbon dioxide, nitrogen and the like and accordingly, it cannot be used practically as a vessel for storing oxidizable, perishable or discolorable substances.

Polymide resins also have a serious defect; they exhibit a high transmission rate of water vapour therethrough. But, they have not the defect possessed by polyethylene as mentioned above; they do not have a high transmission rate of such substances as the above-listed chemicals, gases, gasoline and the like.

Thus, if a combination of both the polymers is used as a raw material for a shaping article, it can be naturally expected that plastic shaped articles having unique characteristics from a viewpoint of practical use may be obtainable, which characteristics cannot be possessed by any plastic articles shaped from the single polymer component. In order to realize this expectation, some proposals have heretofore been made, for example, a mixture of polyolefin and polyamide has been utilized as a shaping material, and sheet or film materials of polyolefin and polyamide have been stuck to each other to form an article having a double layered wall structure. Among others, the latter proposal appears to be rather hopeful. Polyolefin is however extremely inferior in compatibility with polyamide, because of polyolefin's nonpolarity, and consequently it is difficult to ensure a strong bonding force between the two polymers.

In order to ensure a strong bonding force between both polymers, it has been, up to now, proposed to blend two polymers with each other under a high pressure as disclosed in Japanese Patent Publication 11,981/61 or to blend both polymers with a third component to thereby ensure compatibility or affinity between both polymers as disclosed in Japanese Patent Publications 6,529/1968 and 12,670/1970. These proposals can not however completely make the best of the strong points of both polymers, because permeability to water vapour inevitably increases in a corresponding degree to an increase of the amount of polyamide used and, also, permeability to various gases and gasoline also increases in a corresponding degree to an increase of the amount of polyethylene used; permeability to gasoline, water vapour and the like through the resultant shaped article is quite high as compared with those obtained from the single polyethylene or polyamide resin.

Thus, it appears preferable for the best use of the advantages of both the polymers to provide a double layered wall structure wherein each layer consists essentially of a single polymer component different from that of the other layer, but in this case, it should be noted that there exists a problem awaiting solution, i.e. how to ensure a strong bonding force between the two layers, as mentioned above.

A few proposals have been made for the resolution of the problem; one proposal involves the introduction of a gas into the annular space enclosed by two concentric tubular films immediately after both films are extruded out from ring nozzles, which gas is capable of chemically reacting upon at least one surface of the two films, to thereby create a relatively strong bond at a position where both the films are joined together, as disclosed in Japanese Patent Publication 1925/1964. However, the proposal also has some defects; more complicated apparatus is required and the resulting adhesion strength between the two layers is not enough to be entirely satisfactory. Further, it is difficult to apply the process technique to the production of blow molded bottles.

Therefore, an object of the present invention is to provide a thermoplastic resin shaped article having a double layered wall structure wherein both layers are strongly bonded with each other.

Another object of the present invention is to provide a process for producing the shaped article which process is not accompanied by any of the problems encountered in known shaping processes.

Other objects and advantages of the present invention will become apparent from the following description.

These objects are achieved by the provision of a thermoplastic resin shaped article having a double layered wall structure, (1) one layer of which comprises a mixture of (a) 30 to 95% by weight of a homo- or copolymer of olefin having two or three carbon atoms or a blend thereof, and (b) 5 to 70% by weight of an ethylene copolymer comprising 90 to 99.9% by mole of ethylene and 0.1 to 10% by mole of at least one $\alpha,\beta$-unsaturated mono- or di-carboxylic acid or a functional derivative thereof, and (2) the other layer of which comprises polyamide.

The thermoplastic shaped article of the present invention includes, for example, a hollow article having a double layered wall structure such as vessels and bottles shaped by blow molding, a tubular article having the same structure such as tubes and pipes shaped by extrusion, a double layered film shaped by inflation extrusion and other double layered wall hollow articles of any cross-sectional shape such as ellipse, polygon and the like.

Polyamide, which composes one layer of the shaped article of the invention, means that possessing a recurring unit of an amide group in the main chain thereof, and includes, for example nylon-6 prepared by ring-opening-polymerization of $\epsilon$-caprolactam, nylon 11 prepared by polycondensation of $\omega$-aminoundecanoic acid, nylon-12 prepared by ring-opening-polymerization of $\omega$-lauryl-lactam, nylon-66 prepared by polycondensation between hexamethylenediamine and adipic acid, nylon-610 prepared by polycondensation between hexamethylenediamine and sebacic acid or copolymer prepared by co-polycondensation thereof such as nylon-6/nylon-66 and nylon-66/nylon-610 or mixtures thereof.

An olefin polymer component, which composes the other layer of the shaped article of the present invention as a mixture with the ethylene copolymer, includes, for example, low, medium or high density polyethylene, polypropylene, or copolymer such as ethylene-propylene copolymer or ethylene or propylene copolymer containing less than 30% by weight of a copolymerizable monomer such as vinyl acetate, acrylic acid or alkyl esters thereof and methacrylic acid or alkyl esters thereof, or a blend thereof.

An ethylene copolymer component to be used as a mixture with the olefin polymer component is that which comprises 90 to 99.9% by mole of ethylene and 0.1 to 10% by mole of at least one $\alpha,\beta$-unsaturated mono- or di-carboxylic acid or a functional derivative thereof. The comonomer component to be copolymerized with ethylene includes, for example, $\alpha,\beta$-unsaturated monocarboxylic acids having 3 to 4 carbon atoms such as acrylic acid and methacrylic acid; $\alpha,\beta$-unsaturated dicarboxylic acids having 4 to 5 carbon atoms such as maleic acid, fumaric acid and itaconic acid; and functional derivatives such as amides; esters, preferably alkyl esters, most preferably the alkyl group having 1 to 2 carbon atoms; acid anhydride; and salts with metal such as sodium, potassium, zinc and copper. An optimum comonomer is a zinc salt of acrylic acid or of methacrylic acid.

The ethylene copolymer exhibits not only improved compatibility with the polyolefin because of its chemical structure being analogous to that of the polyolefin, but also a strong bonding force to polyamide because of the ethylene copolymer possesses a polar group in its molecule, in a striking contrast to the polyolefin. It should be noted, though no theoretical explanations can be given, that in the case where adhesion strength between both polyamide and the polyolefin layers is intended to be increased by the incorporation of the ethylene copolymer, a stronger force is obtainable when the ethylene copolymer is incorporated into the polyolefin than that obtained by the incorporation of same into polyamide or both polyamide and the polyolefin.

In the practice of the present invention, only a very small amount of the ethylene copolymer needs to be mixed with the polyolefin in order to obtain some benefits. However, generally for most uses at least about 5% by weight of the ethylene copolymer should be present in the mixture. An upper limit of the amount of the ethylene copolymer should be generally about 70% by weight because of physical and mechanical properties of the resulting shaped article and cost considerations. Thus, it is preferred that the amount of the ethylene copolymer present in the mixture is within the range of 5 to 70% by weight. In the case where particularly low permeability to water is desired, the range is preferably from 5 to 45% by weight.

Further, in the practice of the present invention, a combination of (1) polyethylene having a so-called "low" or "medium density," i.e. from 0.91 to 0.93 and having a melt index of 0.2 to 2.0 as a polyolefin component to be admixed with the ethylene copolymer to thereby compose one layer of the shaped article and (2) highly viscous polyamide having a relative viscosity ($\eta_r$) of 4.0 to 8.0 as a polyamide component to compose the other layer is most preferred for optimum results; the combination ensures a particularly improved adhesion strength between both the layers. Further, the combination is advantageously employed in a shaping process, such as blow molding process, wherein shaping material having a relatively high melt viscosity is needed. When a combination obverse to the above, i.e. comprising polyethylene of a high melt viscosity and polyamide of a low melt viscosity, is employed in a blow molding process, it is difficult to accurately control the thickness due to the difference between flow rates of both polymers in the junction inside a die and to produce a uniform parison, whereas the former combination has no such difficulties. Additionally, the former combination provides a shaped article having excellent transparency because low or medium density polyethylene is superior in transparency to high density polyethylene.

The invention is further illustrated with reference to the accompanying drawing, which exemplifies a blow molding technique as one of the most typical shaping process techniques.

Both shaping materials for composing an outer layer and an inner layer of the blow molded article are separately kneaded by means of screws 2 and 4 in extruders 1 and 3, respectively. One kneaded material for composing the inner layer is extruded out from the extruder 3 and allowed to flow through a connecting pipe 6 and a circular path between intermediate dies 8 and 9 and a spider 10 and an inner die 11 into a junction between an inner die 12 and an outer die 13. Another kneaded material for composing the outer layer is extruded out from the extruder 1 and allowed to flow through a connecting pipe 5 and a circular path between the intermediate dies 8 and 9 and a die body 7 into the junction. Both the materials are stuck together at the junction and extruded from a die orifice as a double layered tubular article. If required, compressed air is blown at a stated pressure through a blow pipe 14 into an inside of the extruded article positioned in an appropriate mold (not shown in FIG. 1) to thereby shape the extruded article into a desired form.

FIG. 1 is illustrative of only a blow molding technique, but, it should be understood that the invention is not limited thereto; both shaped materials may be shaped into any articles by any other shaping techniques, for example, by an inflation extrusion technique through an upward directed die orifice or by a pipe-extrusion technique through a horizontally directed die orifice, and both techniques may be effected by utilizing a similar apparatus to that shown in FIG. 1.

In the practice of the invention, both shaping materials may be stuck together after leaving the die. However, it has been found from our extensive research that it is most preferable to join both materials together before they are solidified by cooling, more particularly, before they leave the die, i.e. while they are inside the die and to apply a high pressure to them of not less than 15 kg./cm.$^2$, preferably within the range of 20 to 300 kg./cm.$^2$ for the enhancement of adhesion strength.

Apparently the particular manner whereby the ethylene copolymer is incorporated into the polyolefin is not critical. However, it has been found that a so-called "dry-blend" method wherein blending is effected within a shaping extruder results in an improved adhesion strength of about two or three times that obtained by blending both materials at the stage of pelletizing prior to the introduction into the shaping extruder. This cannot be explained exactly, but it appears to us that the blending at the pelletizing stage results in a far more uniform blend, because both materials are subjected to kneading twice, i.e. at both stages of pelletizing and shaping, in which case the amount of the ethylene copolymer actually contacted with the surface of the polyamide layer is rather small in comparison with the amount actually used.

The shaped article having a double layered wall-structure, thus prepared, possesses excellent characteristics such as an extremely reduced transmission rate of various chemicals chemicals and gases such as water vapour, and a high mechanical strength, and therefore, it is fit for various uses such as vessels for storing food, gasoline and the like.

In particular, the double layered shaped article such as the blow molded vessel wherein the inner layer comprises a polyethylene mixture and the outer layer comprises polyamide has additional advantages; it is superior in printability, abrasion resistance and surface rigidity, because of characteristic of the polyamide outer layer. Further, it is particularly useful as a food storing vessel because of harmlessness of the polyethylene inner layer. Thus, the vessel has enhanced usefulness.

The invention is further illustrated in the following examples, wherein all parts and percentages are by weight unless otherwise specified and both melt index and relative viscosity ($\eta_r$) were determined in accordance with ASTM D-1238-52T and Japanese Industrial Standard K-6810, respectively.

Control Example 1

Utilizing an apparatus shown in FIG. 1, tubular articles having a double layered wall structure were shaped from high density polyethylene having a density of 0.945 and a melt index of 0.3 ("Sholex 5003" made by Showa-Yuka K.K., Japan), an ethylene copolymer containing zinc methacrylate, graded for a blow molding purpose, which has a density of 0.96 and a melt index of 0.7 (Ionomer resin "Surlyn A 1706," made by Du Pont, U.S.A.) and a nylon-6 graded for a general purpose ("CM 1011" made by Toray Ind. Inc., Japan), wherein the ethylene copolymer "Surlyn A 1706" was incorporated into polyethylene, nylon-6 and both polyethylene and nylon-6, respectively. The manner whereby the ethylene copolymer was incorporated into polyethylene and the amount of the ethylene copolymer incorporated thereinto were varied are shown in Table 1.

Cylinder diameters of both the extruders 1 and 3 were 50 mm. ($L/D=20$) and 30 mm. ($L/D=22$), respectively. A pressure of 100 to 150 kg./cm.² was applied within the die.

Adhesion strength of the resultant tubes is shown in Table 1, the adhesion strength indicating the load in g./cm. required to peel off one layer of the sheet specimen from the other layer over a length of 1 cm.

|  | Surlyn A 1706 was incorporated into— | | | |
|---|---|---|---|---|
| Amount of Surlyn 1706 incorporated [1] | Polyethylene | | Both polyethylene and nylon [2] | Nylon |
|  | Dry blend | Pelletizing | Dry blend | Dry blend |
| 0 | 0 | 0 | 0 | 0 |
| 5 | 66.3 | 28.1 | 52.5 |  |
| 10 | 112.5 | 34.4 | 55.6 |  |
| 20 | 148.4 | 82.5 |  | 60 |
| 30 | 200.7 |  |  |  |
| 50 | 821.7 |  |  |  |
| 70 | ([3]) |  |  |  |

[1] In parts, based on 100 parts of the resulting polymer mixture.
[2] The incorporation of Syrlyn A 1706 into both polyethylene and nylon results in articles of greater permeability to water vapour, gasoline and the like, but, experiments were performed only for the purpose of testing adhesive strength.
[3] Impossible to peel off.

It is evident from Table 1 that the incorporation of Surlyn A into a polyethylene results in articles having a far higher adhesion strength than those obtained by the incorporation of same into nylon or both polyethylene and nylon, and that, with respect to the method whereby Surlyn A is incorporated into polyethylene, a dry-blend method is superior to a pelletizing method.

Examples 1–8

70 parts of polyethylene graded for a blow molding purpose having a density of 0.945 and an melt index of 0.3 and 30 parts of Surlyn A, being the same as that used in Control Example 1, were mixed by a dry-blender to form pellets.

Utilizing the same apparatus as that of Control Example 1, the pellet was fed into the extruder 1 having a cylinder diameter of 50 mm. ($L/D=20$) and melted at temperatures of 200 to 250° C. to thereby form an outer layer of a tube. Also, nylon-6 graded for a general purpose having a melt viscosity ranging from 1,000 to 3,000 poise was fed into the other extruder 3 and melted at temperatures of 220 to 250° C. to thereby form an inner layer thereof. A pressure of 100 to 150 kg./cm.² was applied inside the die. The resultant tube having a double layered wall structure shaped as a double layered parison was subjected to blow molding by commercially available apparatus in a normal manner to thereby form a cylindrical bottle of approximately one litre capacity. The thicknesses of the outer layer and the inner layer were 1.0 mm. and 0.3 mm., respectively.

The bottle, thus prepared, exhibited a high adhesion strength between both the outer layer comprising polyethylene and the ethylene copolymer and the inner layer comprising nylon-6. For example, when five bottles, each of which was filled with water and covered with a cap, were allowed to fall from a height of 2 m., no peeling-off was observed between the layers, much less breakdown. Most blow molded bottles, when dropped, are broken usually at the pinch-off portion of the bottom thereof, but the above result shows that the pinch-off portion of the inventive bottle has an impact strength high enough for practical use.

When the bottle filled with water was left as it was, over a period of 60 days for the observation of peeling-off between both layers which peeling-off was surmised to arise from a dimensional change (swelling due to absorbed water) of the nylon inner layer, no change was observed.

The shaping procedure as mentioned above was repeated wherein various ethylene copolymers and polyamides were used and the amount of the ethylene copolymers incorporated into polyethylene was varied with all other conditions remaining substantially the same. Adhesion between both the inner and outer layers of the resultant bottles was tested, results of which are shown in Table 2.

The bottle of Example No. 1 (control), the outer and inner layers of which comprise polyetheylene (without the incorporation of ethylene copolymer) and polyamide, respectively. Seemingly exhibited a good adhesion, but when it was manually distorted, both the layers were easily peeled off. The pinch-off portion of the bottom thereof had a low impact strength; the bottle was partially broken when dropped from a height of 1 m. and completely broken from a height of 2 m. Further, when the bottle filled with water was left as it was, the nylon inner layer was changed in dimension thereof due to the absorption of water and completely peeled off from the outer layer within 24 hours, showing that it has little or no value as a commercial article.

TABLE 2

| Example number | Outer layer | | | Inner layer | Adhesion |
|---|---|---|---|---|---|
| | Polyethylene | Comonomer and its content [%] in the ethylene copolymer | | Polyamide | |
| 1 (Control) | H [1] [3] (100) | | | Nylon-6 | X [6] |
| 2 | H (90) | Zinc methacrylate [4] | [3] (10) | do | O |
| 3 | H (70) | do | (30) | do | ⊚ |
| 4 | H (50) | do | (50) | do | ⊚ |
| 5 | H (80) | Sodium methacrylate [5] | (20) | Nylon-66 | O |
| 6 | H (70) | Acrylic acid amide [20%] | (30) | Nylon 610 | O |
| 7 | H (70) | Acrylic acid ester [20%] | (30) | Nylon-12 | O |
| 8 | L [2] (70) | Sodium methacrylate [5] | (30) | Nylon-6 | O |

[1] H—High density polyethylene.
[2] L—Low density polethylene.
[3] All the numerals within parentheses indicate the amount of the polymer used, in parts by weight.
[4] Ionomer resin "Surlyn A 1706" made by Du Pont.
[5] Ionomer resin "Surlyn A 1707" made by Du Pont.
[6] Marks ⊚, O, X indicate excellent, very good and poor, respectively.

Example 9

The shaping procedures of Examples 1 to 8 were repeated wherein polypropylene having a density of 0.91 and a melt index of 0.5 (Noblene BEB-G, made by Mitsu-Toatsu Chemical Co., Japan) was substituted for the polyethylene with all other conditions remaining substantially the same. Adhesion strength of the resultant bottles is shown in Table 3.

TABLE 3

| Outer layer | | Adhesion strength (g./cm.) |
|---|---|---|
| The amount of Surlyn A 1706 used (parts) | The amount of polypropylene used (parts) | |
| 0 | 100 | 0 |
| 5 | 95 | 240.0 |
| 10 | 90 | 186.3 |
| 20 | 80 | 176.3 |
| 30 | 70 | 226.9 |

As is evident from Table 3, adhesion strenth does not increase in proportion as the amount of Surlyn A used increases, which is in striking contrast to the polyethylene outer layer shown in Control Example 1, but an extremely high adhesion strength can be ensured even in the case where a small amount of Surlyn A is added.

Example 10

The shaping procedure of Examples 1 to 8 was repeated wherein the outer layer was prepared from a mixture of 70 parts of polyethylene graded for a film purpose, having a density of 0.924 and a melt index of 2.0 and 30 parts of an ethylene copolymer graded for a film purpose, containing zinc methacrylate and having a density of 0.95 and a melt index of 2.0 (Surlyn A 1650) and the inner layer was prepared from nylon-6 graded as general purpose, having a melt viscosity ranging from 1,000 to 3,000 poise, with all other conditions remaining substantially same.

A double layered tube, thus prepared, was shaped into a film by a commercially available inflation film-shaping apparatus, the thicknesses of the outer and inner layers of which film were 40μ and 10μ, respectively. When the film was manually bent, neither of the layers were easily peeled off.

Control Example 2

The shaping procedure of Example 2 was repeated wherein both the outer flow of a mixture of 90 parts of high density polyethylene and 10 parts of Surlyn A and the inner flow of nylon-6 were joined together under various pressures inside a die. Adhesion strength of the resultant bottle is shown in Table 4.

TABLE 4

| Pressure inside a die (kg./cm.²) | Adhesion strength (g./cm.) |
|---|---|
| 0 [1] | 3.8 |
| 15 | 21.1 |
| 20 | 71.8 |
| 50 | 98.5 |
| 100 | 112.5 |
| 300 | 124.7 |

[1] The pressure of 0 kg./cm.² means that both the outer and inner flows were joined together after they left the die.

As evident from Table 4, adhesion strength increases with an increase of the pressure applied at the junction inide a die.

Example 11

Low density polyethylene graded for a blow molding purpose, having a density of 0.924 and a melt index of 0.3 and high density polyethylene graded for a blow molding purpose, having a density of 0.945 and a melt index of 0.3 were mixed with an ethylene copolymer "Surlyn A" graded as a blow molding purpose, having a density of 0.96 and a melt index of 0.7, respectively, in various proportions by a pelletizer to form pellets.

Utilizing the same apparatus as that of Control Example 1, the pellet was fed into the extruder 3 having a cylinder diameter of 30 mm. ($L/D=20$) and melted at temperatures of 180 to 250° C. to thereby form an inner layer. Also, nylon-6 graded for a blow molding purpose, having a relative viscosity ($\eta_r$) of 5.5 ("Amilan CM1031" made by Toray Ind. Inc., Japan) was fed into the other extruder 3 having a cylinder diameter of 50 mm. ($L/D=20$) and melted at temperatures of 220 to 250° C. to thereby form an outer layer. A pressure of 50 kg./cm.2 was applied inside the die. The resultant tube shaped as a double layered parison was subjected to blow molding in the same manner as those of Examples 1 to 8 to thereby form a cylindrical bottle of approximately 500 ml. capacity. The thickness of the outer and inner layers thereof were 0.2 mm. and 0.15 mm., respectively.

Adhesion strength of the bottles is shown in Table 5, wherein LDPE and HDPE indicate low density polyethylene and high density polyethylene, respectively.

TABLE 5

| The amount of Surlyn A used (parts) | Adhesion strength (g./cm.) | |
|---|---|---|
| | Inner/outer =LDPE/nylon | Inner/outer =HDPE/nylon |
| 0 [1] | 0 | 0 |
| 5 | 40.3 | 13.8 |
| 10 | 91.8 | 20.5 |
| 20 | 221.5 | 52.4 |
| 30 | 605.0 | 81.1 |
| 40 | ([2]) | 119.6 |

[1] In parts, based on 100 parts of the resulting polymer mixture.
[2] Impossible to peel off.

Transparency of the bottles was compared with each other, which was indicated by total light transmittance (percent) and parallel light transmittance (percent) determined in accordance with ASTM D1003-52T. Results are shown in Table 6.

TABLE 6

|  | Inner/outer =LDPE/nylon | Inner/outer =HDPE/nylon |
|---|---|---|
| Total light transmittance (percent) | 87.1 | 83.1 |
| Parallel light transmittance (percent) | 70.2 | 25.0 |

As evident from Table 6, the shaped article comprising low density polyethylene is superior in transparency to that comprising high density polyethylene. The latter is nearly opaque, but the former exhibits excellent transparency.

Examples 12 to 17

The shaping procedure of Example 11 was repeated wherein the inner layers were prepared from mixtures of 90 parts of low density polyethylene graded for a blow molding purpose, having a density of 0.920 and a melt index of 0.5 and 10 parts of various ethylene copolymers and the outer layers were prepared from nylon-6 and nylon-66 with all other conditions remaining substantially the same.

Adhesion of the resultant bottles is shown in Table 7.

TABLE 7

| Example number | Inner layer | | Outer layer | Adhesion |
|---|---|---|---|---|
|  | Polyethylene | Comonomer and its content (percent) in the ethylene copolymer | Polyamide |  |
| 12 | Low density polyethylene | Methacrylic acid, 20% | Nylon-6 | ▲[3] |
| 13 | do | Na methacrylate [1] | do | ○ |
| 14 | do | Zn methacrylate [2] | do | ◎ |
| 15 | do | Acrylic acid, 20% | do | ▲ |
| 16 | do | Zn acrylate, 20% | do | ○ |
| 17 | do | Zn methacrylate [2] | Nylon-66 | ◎ |

[1] Surlyn A 1707.
[2] Surlyn A 1706.
[3] Marks ◎, ○ and ▲ indicate excellent, very good and good.

As is evident from Table 7, the ethylene copolymer containing zinc methacrylate is most preferably used for the incorporation into polyethylene. The cylindrical bottle having a capacity of 500 cc., the thickness of the outer and inner layers of which were 0.2 mm. and 0.15 mm., respectively, exhibited a high adhesion strength between both the layers; when the bottle filled with water and covered with a cap was allowed to drop from a height of 2 m., no peeling-off was observed between the layers, much less breakdown. Even when the bottle was left under severe conditions, e.g. immersed in a water bath at temperatures of 30 to 80° C., little or no reduction of the adhesion strength between the two layers was observed.

Example 18

The shaping procedure of Example 11 was repeated wherein a mixture of 90 parts of low density polyethylene and 10 parts of Surlyn A was used for the inner layer and nylon-6 was used for the outer layer, relative viscosity ($\eta_r$) of which was varied for comparison purposes of the blow molding processabilities, i.e. capability of forming a uniform parison, of the resultant bottles. Results are shown in Table 8.

TABLE 8

| Relative viscosity ($\eta_r$) of nylon-6: | Blow molding processability |
|---|---|
| 2.0–2.9 | Not capable. |
| 3.0–3.9 | Difficult. |
| 4.0–4.9 | Capable. |
| More than 5.0 | Easily capable. |

As evident from Table 8, it is difficult with nylon having a low or medium viscosity, i.e., a relative viscosity of less than 3.9 to form a uniform parison, but the nylon having a high viscosity, i.e. a relative humidity exceeding 4.0, preferably exceeding 5.0 is capable of forming an extremely uniform parison.

What we claim is:

1. A process for producing a thermoplastic resin shaped article having a high bond strength double layered wall structure comprising the steps of:
    separately melting (1) a mixture of (a) 30 to 95% by weight of a homopolymer of olefin having two or three carbon atoms or a blend thereof, and (b) 70 to 5% by weight of an ethylene copolymer comprising 90 to 99.9% by mole of ethylene and 10 to 0.1% by mole of a zinc salt of methacrylic acid and (2) a polyamide;
    joining both of said melts under a pressure inside a die of an extruder, extruding said melts as a double layered tubular article and;
    subjecting said article to blow molding after extrusion from said die.

2. A process according to claim 1, wherein said $\alpha,\beta$-unsaturated mono- or dicarboxylic acid is at least one selected from the group consisting of acrylic acid and methacrylic acid.

3. A process according to claim 1, wherein said ethylene copolymer comprises 90 to 99.9% by mole of ethylene and 10 to 0.1% by mole of zinc salt of acrylic acid or of methacrylic acid.

4. A process according to claim 1, wherein said pressure is not less than 15 kg./cm.[2].

5. A process according to claim 1, wherein said mixture (1) comprises (a) polyethylene having a density of 0.91 to 0.93 and a melt index of 0.2 to 2.0 and (b) said ethyelne copolymer, and said polyamide (2) has a relative viscosity ($\eta_r$) of 4.0 to 8.0.

6. A process according to claim 1, wherein said mixture (1) comprises (a) 55 to 95% by weight of said homopolymer or copolymer component and (b) 45 to 5% by weight of said ethylene copolymer component.

7. A process according to claim 1, wherein said shaped article is a blow molded vessel having an outer layer of polyamide and having an inner layer of said mixture of polyethylene and said ethylene copolymer.

References Cited

UNITED STATES PATENTS

| 2,953,541 | 9/1960 | Pecha et al. | 260—897 B |
| 3,457,337 | 7/1969 | Turner | 264—98 |
| 3,082,484 | 3/1963 | Sherman | 264—98 |
| 3,223,761 | 12/1965 | Raley | 264—171 |
| 3,479,425 | 11/1969 | Lefevre et al. | 264—171 |
| 3,508,944 | 4/1970 | Henderson et al. | 264—95 |
| 3,312,762 | 4/1967 | Wechsler et al. | 264—98 |
| 3,184,358 | 5/1965 | Utz | 264—83 |
| 3,322,869 | 5/1967 | Scott, Jr. | 264—98 |
| 3,524,795 | 8/1970 | Peterson | 264—171 |

JEFFERY R. THURLOW, Primary Examiner

U.S. Cl. X.R.

260—897 A; 264—98, 173, 209